United States Patent
Wolf et al.

(10) Patent No.: US 10,803,710 B2
(45) Date of Patent: Oct. 13, 2020

(54) CASSETTE SYSTEM FOR SECURE RESOURCE DISTRIBUTION

(71) Applicant: BANK OF AMERICA CORPORATION, Charlotte, NC (US)

(72) Inventors: Jon Robert Wolf, Charlotte, NC (US); Matthew Edward Williams, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 666 days.

(21) Appl. No.: 15/633,238

(22) Filed: Jun. 26, 2017

(65) Prior Publication Data

US 2018/0251301 A1    Sep. 6, 2018

Related U.S. Application Data

(60) Provisional application No. 62/466,914, filed on Mar. 3, 2017.

(51) Int. Cl.
*G07F 19/00*     (2006.01)
*H04W 72/04*     (2009.01)
(Continued)

(52) U.S. Cl.
CPC .......... *G07F 19/211* (2013.01); *B65G 1/137* (2013.01); *G06F 21/31* (2013.01); *G06F 21/62* (2013.01); *G06Q 10/0832* (2013.01); *G06Q 20/204* (2013.01); *G07D 11/12* (2019.01); *H04L 63/105* (2013.01); *H04L 67/36* (2013.01); *H04M 1/7253* (2013.01); *H04M 1/72577* (2013.01);
(Continued)

(58) Field of Classification Search
CPC ........ G07F 19/211; G06F 21/31; G06F 21/62; G06Q 10/0832; G06Q 20/204; H04W 76/11; H04L 63/105; H04L 67/36; G07D 11/12; B65G 1/137
See application file for complete search history.

(56) References Cited

U.S. PATENT DOCUMENTS

| | | | |
|---|---|---|---|
| 5,626,822 A * | 5/1997 | Kadowaki | A61L 2/04 422/307 |
| 6,145,738 A | 11/2000 | Stinson et al. | |

(Continued)

OTHER PUBLICATIONS https://www.regions.com/personal_banking/depositsmart_atms.rf.
http://www.bankrate.com/financing/banking/check-cashing-comes-to-atms/.
https://www.americanbanker.com/news/getting-cash-phone-it-in-wintrust-embraces-the-cardless-atm.

*Primary Examiner* — Laura A Gudorf
(74) *Attorney, Agent, or Firm* — Michael A. Springs; Moore & Van Allen PLLC; R.W. McCord Rayburn

(57) ABSTRACT

Embodiments of the present invention are directed to systems, methods, and computer program products for a cassette system and device network for secure resource replenishment and distribution among a plurality of computer terminals. A resource replenishment device comprising a tamper-proof, sealable container may securely store and transport one or more resources within the interior of the device. The resource replenishment device may be used for efficiently fulfilling calculated resource deficiency requests at one or more computer terminals, wherein resources may be transferred to the resource replenishment device from a resource reserves station for transport and transfer to a resource-deficient, requesting computer terminal.

20 Claims, 10 Drawing Sheets

(51) Int. Cl.

| | | |
|---|---|---|
| *H04L 29/08* | (2006.01) | |
| *H04M 1/725* | (2006.01) | |
| *H04W 4/02* | (2018.01) | |
| *H04W 76/11* | (2018.01) | |
| *H04W 76/20* | (2018.01) | |
| *G07D 11/12* | (2019.01) | |
| *G06Q 20/20* | (2012.01) | |
| *B65G 1/137* | (2006.01) | |
| *G06F 21/31* | (2013.01) | |
| *G06F 21/62* | (2013.01) | |
| *G06Q 10/08* | (2012.01) | |
| *H04L 29/06* | (2006.01) | |
| *H04M 15/00* | (2006.01) | |

(52) U.S. Cl.
CPC ......... *H04W 4/023* (2013.01); *H04W 72/048* (2013.01); *H04W 76/11* (2018.02); *H04W 76/20* (2018.02); *H04M 15/854* (2013.01); *H04M 15/93* (2013.01)

(56) References Cited

U.S. PATENT DOCUMENTS

| | | | |
|---|---|---|---|
| 6,191,690 B1 * | 2/2001 | Mukogawa | E05G 1/10 340/568.7 |
| 6,328,207 B1 | 12/2001 | Gregoire et al. | |
| 6,536,663 B1 | 3/2003 | Lozier et al. | |
| 6,578,760 B1 | 6/2003 | Otto | |
| 6,669,086 B2 | 12/2003 | Abdi et al. | |
| 6,856,965 B1 | 2/2005 | Stinson et al. | |
| 7,090,122 B1 | 8/2006 | Warren et al. | |
| 7,257,246 B1 | 8/2007 | Brodie et al. | |
| 7,559,461 B2 | 7/2009 | Crowell et al. | |
| 7,611,048 B1 | 11/2009 | Warren et al. | |
| 7,840,485 B1 | 11/2010 | Warren et al. | |
| 8,096,398 B2 | 1/2012 | Folk et al. | |
| 8,172,067 B1 | 5/2012 | Folk et al. | |
| 8,225,988 B1 | 7/2012 | Bohen et al. | |
| 8,249,989 B2 | 8/2012 | Allen | |
| 8,332,321 B2 | 12/2012 | Bosch et al. | |
| 8,424,755 B1 | 4/2013 | Irudayam et al. | |
| 8,548,912 B2 | 10/2013 | Cincera | |
| 8,573,484 B1 | 11/2013 | Irudayam et al. | |
| 8,972,297 B2 | 3/2015 | Kay et al. | |
| 8,985,298 B2 | 3/2015 | Crist et al. | |
| 9,076,135 B2 | 7/2015 | Dent et al. | |
| 9,163,978 B2 | 10/2015 | Crist et al. | |
| 9,311,632 B1 | 4/2016 | Dent | |
| 9,368,002 B2 | 6/2016 | Crist et al. | |
| 9,380,421 B1 | 6/2016 | Vltavsky | |
| 9,432,804 B2 | 8/2016 | Hanson et al. | |
| 9,525,694 B2 | 12/2016 | Pender | |
| 9,589,256 B1 | 3/2017 | Thomas et al. | |
| 2007/0187485 A1 * | 8/2007 | Aas | G07D 11/135 235/379 |
| 2012/0028609 A1 | 2/2012 | Hruska | |
| 2012/0084203 A1 | 4/2012 | Mehew et al. | |
| 2012/0323361 A1 * | 12/2012 | Brexel | G07D 11/125 700/236 |
| 2013/0046687 A1 | 2/2013 | Simpson, Jr. | |
| 2013/0119126 A1 * | 5/2013 | Dietz | G07D 11/32 235/379 |
| 2013/0205723 A1 | 8/2013 | Blake et al. | |
| 2016/0176665 A1 * | 6/2016 | Zhao | B42F 17/14 271/149 |
| 2019/0073854 A1 * | 3/2019 | Machida | G07D 11/0087 |

* cited by examiner

CASSETTE SYSTEM FOR SECURE RESOURCE DISTRIBUTION

RELATED APPLICATIONS AND PRIORITY CLAIM 35 U.S.C. § 119

This application is a non-provisional filing of U.S. Provisional Application No. 62/466,914, filed Mar. 3, 2017, the contents of which are hereby incorporated by reference herein.

BACKGROUND

Computer terminals are commonly used by individuals to perform a variety of activities. A needs exists for improved computer terminals with enhanced communication and interaction capabilities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for secure resource distribution, the invention generally comprising in some embodiments: a resource replenishment device; a computer terminal; a memory device comprising computer-readable program code; a communication interface; and a processor operatively coupled to the memory device, and the communication interface, wherein the processor is configured to execute the computer-readable program code to: establish a connection between the resource replenishment device and the computer terminal; determine a first resource amount of one or more resources stored within the resource replenishment device; and transfer at least a portion of the one or more resources between the resource replenishment device and the computer terminal.

In some embodiments, the resource replenishment device further comprises a tamper-proof container with a sealable opening positioned between an interior and an exterior of the tamper-proof container; and a resource transfer mechanism positioned proximate to the sealable opening, wherein the tamper-proof container securely stores the one or more resources within the interior of the tamper-proof container, and wherein the resource transfer mechanism transports the one or more resources through the at least one sealable opening positioned between the interior and the exterior of the tamper-proof container.

In some embodiments, the resource transfer mechanism comprises at least one motorized roller positioned proximate to the sealable opening of the tamper-proof container, wherein the motorized roller frictionally and rotatably contacts at least a portion of the one or more resources to transport the one or more resources between the interior and the exterior of the tamper-proof container.

In some embodiments, the computer terminal further comprises a docking station positioned on an exterior surface of the computer terminal to receive the resource replenishment device, wherein the docking station establishes the connection between the resource replenishment device and the computer terminal.

In some embodiments, the connection established between the resource replenishment device and the docking station at least partially triggers transfer of the one or more resources are transferred between the resource transfer mechanism and the docking station.

In some embodiments, the connection established between the resource replenishment device and the computer terminal is one or more of a wired connection and a wireless connection.

In some embodiments, transferring at least a portion of the one or more resources between the resource replenishment device and the computer terminal further comprises validating authentication credentials received from one or more of the resource replenishment device, the computer terminal, and a user device.

In some embodiments, the processor is further configured to execute the computer-readable program code to: calculate a second resource amount associated with the computer terminal; determine a resource deficiency associated with the computer terminal; and receive a resource replenishment request from the computer terminal, the resource replenishment request comprising a requested resource amount that is at least equal to the resource deficiency.

In some embodiments, the invention further comprises: a resource reserves station positioned remotely from the computer terminal comprising additional resources, wherein the resource replenishment device is detachably coupled with the resource reserves station, and wherein the processor is further configured to execute the computer-readable program code to: receive the resource replenishment request transmitted via the established connection from the computer terminal to the resource reserves station; and in response to receiving the resource replenishment request, transfer at least the requested resource amount of the additional resources to the resource replenishment device from the resource reserves station.

In some embodiments, the resource replenishment device is detached from the resource reserves station, transported to the computer terminal, and connected to the computer terminal to transfer the requested resource amount of the additional resources to the computer terminal.

In some embodiments, the processor is further configured to execute the computer-readable program code to determine the resource deficiency based on the second resource amount associated with the computer terminal being outside of a predetermined limit.

In some embodiments the computer terminal is an ATM.

In some embodiments, the one or more resources comprise at least one of cash, coins, checks, receipts, and printed documents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
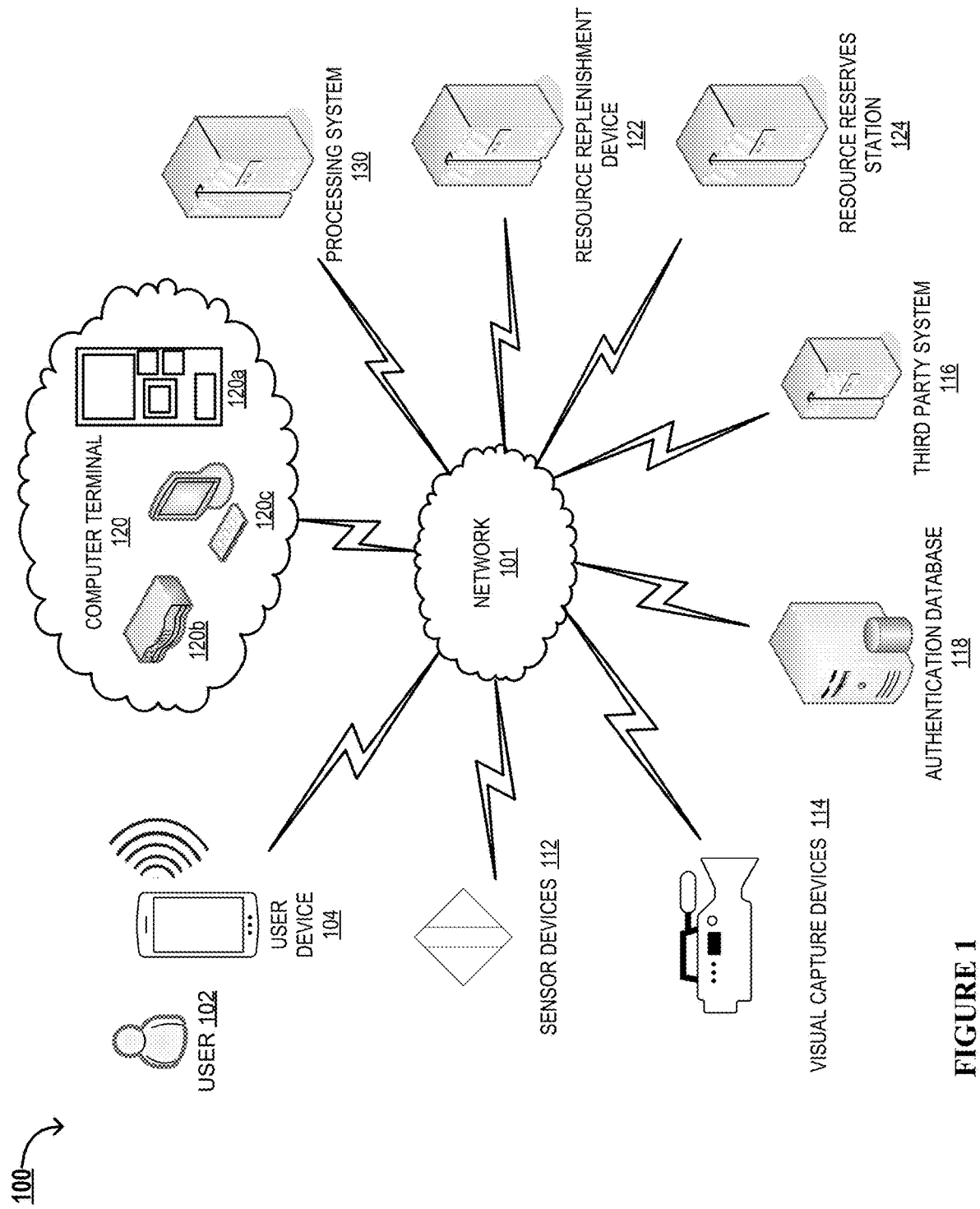
FIG. 1 illustrates a resource replenishment system environment 100, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

The term "computer terminal" or "user activity terminal" as used herein may refer to one or more electronic devices that facilitate one or more user activities or transactions. Typically, a computer terminal is configured to facilitate performance of one or more user activities by establishing an "interactive session" between a user and the computer terminal. As such, the terms "user activity" or "user transaction" or simply "activity" may refer to financial or non-financial activities, tasks, events or actions. In some embodiments a computer terminal refers to one or more devices that facilitate execution of financial transactions or activities. In this regard, the computer terminals may be Automated Teller Machines (ATMs), Point of sale (POS) devices, vending machines, checkout registers, ticket vending machines, automated retail transaction devices, banking terminals in a financial institution, other computing devices that involve financial user activities or transactions in one form or another, or may comprise technology elements and/or functionality of one or more aforementioned devices, or a suitable combination of the aforementioned devices/apparatuses. In some embodiments the computer terminal refers to devices that facilitate execution of non-financial user activities or transactions, for example, check-in terminals for various industries, for example: hospitality, travel, healthcare and the like, information kiosks and other computer terminals that do not involve a user performing a financial transaction via the computer terminal. In some embodiments the computer terminals enable execution of both financial and non-financial transactions/activities (e.g., a computer terminal may be a suitable combination of any of the aforementioned terminal devices with respect to their features, design and/or function). That said, computer terminals may also refer to portable devices that facilitate financial and/or non-financial transactions, such as personal computers, laptop computers, tablet computers, smartphones, wearable devices, personal digital assistants (PDAs), and other computing devices. In some embodiments, the computer terminals may be owned, operated and/or otherwise associated entities and are installed at suitable locations, such that the user can travel to the location of the computer terminal to perform user activities or execute transactions. In some embodiments, the computer terminals may be owned, operated and/or otherwise associated with the user. In embodiments described herein, performing a user activity or transaction may refer to the initiation, stages during the processing, or completion of a transaction. The computer terminal of the present invention is interactive and is configured to communicate with a user using visual, audio or other means, either directly (e.g., using display devices of the computer terminal) or via suitable devices (e.g., via a user mobile device).

"Authentication information" or "authentication credentials" is any information that can be used to identify of a user. Typically, the user may provide authentication credentials for conducting user activities or transactions at the computer terminal. In some embodiments, computer terminals require the user to perform one or more authentication steps based on the level of authorization desired for a particular user activity or transaction. For example, a system may prompt a user to slide cards with magnetic strips, to enter authentication information such as a username, a password, a personal identification number (PIN), a passcode, one or more account numbers, CVV numbers, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users.

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more computer terminals. Typically, the entity owns the computer terminals, operates computer terminals, provides the computer terminal devices, facilitates services associated with the computer terminals, and/or is otherwise associated with the computer terminals.

In accordance with embodiments of the invention, the terms "financial institution" and "financial entity" may be used to include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

An "account" or "resource location" is the relationship that a user has with an entity, such as a financial institution or bank. Examples of accounts include a deposit account, such as a transactional account (e.g., a banking account), a savings account, an investment account, a money market account, a time deposit, a demand deposit, a pre-paid account, a credit account, non-monetary user data that includes information associated with the user, or the like. The account is associated with and/or maintained by the entity. In some embodiments, the account is maintained by a third-party entity or financial institution.

"Resources" may be funds that include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. In some embodiments, "electronic resources" may refer to financial funds and/or resources that are maintained and stored in an electronic form on computer systems or devices. For example, electronic resources may include funds stored in an online banking account maintained by a financial institution. In some embodiments, electronic funds may also refer to other digital currencies and cryptocurrencies which may be stored on a user device or maintained in an account by a third party. In some embodiments, resources may further comprise coupons, offers, rebates, or discounts that are available to the user. In some embodiments, resources may further comprise receipts, documents, or other printed output.

A "transaction" or "interaction" refers to any communication between one or more users, one or more financial institutions, and/or other entities monitoring the user's activities. For example, a transaction may refer to a purchase of goods or services, a return of goods or services, a payment transaction, a credit transaction, a resource transfer, or other interaction involving a user's account. In some embodiments, an interaction may further comprise an offer, quote, or estimate provided by an entity, third party, other user, or the like to the user for consideration.

To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

Typically, the computer terminal 120 is configured to dispense one or more physical items such as currency (e.g., bills or a certain denomination, coins), receipts, printed output and the like. In some embodiments, the computer terminal 120 comprises a docking station (not illustrated) that is configured to receive an item replenishment device for replacing dispensed items in the computer terminal 120. For example, the computer terminal 120 may be depleted in its stock of bills of a first denomination by "N" number of bills. In some instances, the terminal 120 may transmit a signal to the processing system 130 indicating the deficit. Next, an associate or another individual employed by/associated with the entity or financial institution operating the computer terminal 120 may insert an item replenishment device into the docking station. Typically, the item replenishment device (e.g., a cash cassette) is a secure device that is substantially tamper proof. Specifically, an individual having the item replenishment device is typically not able access or even ascertain the type, number or quantity of items in the item replenishment device without damaging the items contained within.

Once the item replenishment device is inserted into the docking station, the computer terminal is typically configured to recognize the device and establish a wireless or wireline communication channel with it. The computer terminal 120 may then determine the type of items contained therein and the number of each item. Based on determining that the item replenishment device comprises at least "N" number of bills of the first denomination, the computer terminal may automatically withdraw the N number of bills from the device and store them within the computer terminal. Based on determining that the item replenishment device does not comprise the "N" number of bills of the first denomination or comprises Y number of bills fewer that those required, the computer terminal may transmit a signal to the device and/or to the processing system indicating the requirement in real time. Subsequently the terminal may withdraw the N-Y number of bills from the device. Next, when the item replenishment device is docked in a resource reserves station of the entity/financial institution (e.g., at an armored cash vehicle, bank vault, or the like), the item replenishment device may automatically communicate to the reserves station regarding the deficit of the required number of bills at the terminal, which may then be inserted into the item replenishment device by the reserves station, automatically and securely, without external stimuli. The computer terminal may withdraw the Y number of bills when the item replenishment device is re-inserted into the docking station.

Referring to FIG. 1, a block diagram illustrating a system environment 100 configured for providing an interactive user activity terminal configured for enhanced resource interchange, is illustrated, in accordance with some embodiments of the invention. As illustrated, the system environment 100 may comprise a computer terminal 120 (also referred to as a user activity terminal 120), in operative communication with one or more user devices 104 associated with a user 102, a processing system 130, one or more sensor devices 112, one or more visual capture devices 114, an authentication database 118, a third party system 116 and/or other systems/devices not illustrated herein, via a network 101. As such, the computer terminal 120 is configured such that the user 102 may perform one or more user activities or transactions by utilizing the computer terminal directly (for example, by physically operating the computer terminal 120 and its interfaces, using input/output devices of the terminal 120, using audio commands, using physical gestures, and the like) and/or via communication between the user device 104 and the terminal 120 (for example, by establishing operative communication channels between the user device 104 and the terminal 120 via a wireless network and interacting with the terminal 120 via the devices and interfaces of the user device 104).

Typically, the processing system 130, the authentication database 118, resource replenishment device 122, resource reserves station 124, and/or other systems and devices described herein are in electronic communication with the computer terminal 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the computer terminal 120). In this regard, the wireless communication channel may further comprise near field communication (NFC), communication via radio waves, communication through the internet, communication via electromagnetic waves and the like.

As discussed previously, the computer terminal 120 is configured to facilitate performance of user activities, and is configured to provide real-time interactive sessions for the user 102. In some embodiments, the computer terminal 120 or the user activity terminal 120 is an ATM 120a configured for uniquely facilitating user activities in accordance with some embodiments, while ensuring the security and privacy of the user. In some embodiments, the computer terminal 120 is a point of sale terminal 120b, a computing device 120c, a vending machine, a kiosk, and/or another device, or a suitable combination of the aforementioned devices, that is configured to facilitate the user activity. The components of the computer terminal 120, its features and functions will be described in detail through this disclosure and with respect to FIG. 2, in particular.

In some embodiments, the computer terminal 120 receives signals, images and other data captured by the sensor devices 112 and/or the visual capture devices 114, during its execution of user activities. In this regard, in some embodiments, the computer terminal 120 communicates with, transmits instructions, and/or receives signals from the sensor devices 112 and the visual capture devices 114 directly, via the network 101, typically, in real-time. In some embodiments, the computer terminal 120 communicates with the sensor devices 112 and the visual capture devices 114 through the processing system 130, typically, in real-time. Analyzing the signals received from the sensor devices 112 and the visual capture devices 114 typically enables the computer terminal 120, the processing system 130, or other system and devices described herein, to determine user location, determine trigger events (e.g., user approach to the terminal 120, retrieve/identify user authentication credentials from the user and/or the user device, establishing communication with the user device in the vicinity of the terminal, determination of whether the user device comprises an integrated resource transfer application, and the like), capture one or more parameters associated with the environment or physical location of the computer terminal 120, and the like.

In some embodiments, the sensor devices 112 are position sensors configured to sense or determine the position and/or location of the user 102, other individuals, objects/devices, or entities. As such, the sensor devices 112 may determine an absolute position (for example, location/positioning coordinates) or a relative position (for example, with respect to the position of the terminal 120, with respect to position of the user or another individual, with respect to the sensor 112 itself or a predetermined object and the like) of the user, individual or object. Here, in some embodiments, the sensor devices 112 are proximity sensors that are configured to determine the presence of the user or object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the terminal 120, and/or the processing system 130, to determine the location of the user/object and/or track movement of the user/object. Here, the sensor 112 may be configured to perform modulation, demodulation, amplification and output switching of the proximity and return signals.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users or objects varies the current flowing through the loop which facilitates determination of presence of users or objects. In some embodiments, the sensor devices 112 comprise sensor devices provided in the user device 104, such as, biometric sensors (for example, fingerprint scanner of a mobile phone, heart rate or temperature monitor of a wearable user device, and the like), location sensors (for example, GPS devices, accelerometers, and the like), visual capture devices/cameras, facial recognition devices, devices for capturing user gestures (for example, a touch screen) and other sensing devices of the user device 104. Here, the computer terminal 120, the processing system 130, and/or other systems and devices described herein may transmit control signals to the user device to cause the sensing devices of the user device 104 to capture one or more parameters and/or to transmit one or more captured parameters.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the computer terminal 120, the processing system 130 and/or the capture devices 114, to determine the presence and position of the user, other individuals or objects and their movement in the proximity area. Although described separately, it is understood that the visual capture devices 114 may be associated with the sensor devices 112. As such, sensors or sensor devices, as alluded to herein, may refer to the various sensor devices described herein and the visual/image capture devices described herein.

As alluded to previously, the processing system 130 is in operative communication with the computer terminal 120. In some embodiments, processing system 130 is configured to transmit control instructions that are configured to cause the computer terminal 120, the user device 104, the sensor device 112, visual capture devices 114, the resource replenishment device 122, the resource reserves station 124, and/or other systems and devices described herein to perform at least a portion of the steps associated with one or more activities. The processing system 130 may be associated with the same entity as the computer terminal 120 or may be associated with another entity. The structure and components of the processing system 130 is described in detail with respect to FIG. 3. The computer terminal 120 may further communicate with the third party system 116, the authentication database 118, resource replenishment device 122, resource reserves station 124, and/or other systems and devices described herein either directly or via the processing system 130. The authentication database 118 may comprise authentication credentials associated with the user. The processing system 130 and/or the computer terminal 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the computer terminals 120 of the present invention are configured to establish operative communication channels with the user device 104 such that, the user 102 may perform one or more user activities, either entirely or in part, at the terminal 120 by interacting with the user device 104. The user device 104 is described in detail with respect to FIG. 4.

Figure 2:
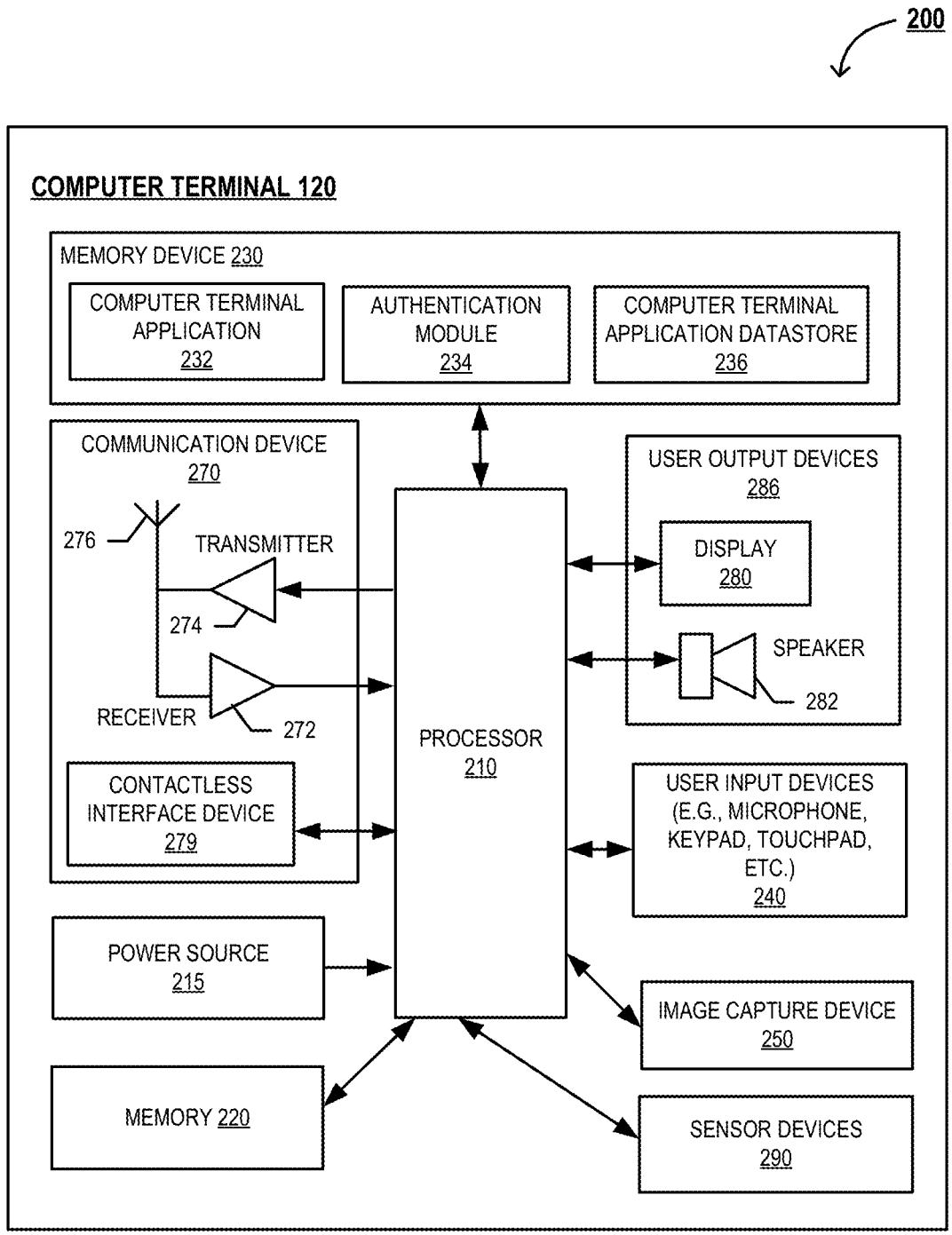
FIG. 2 illustrates a block diagram 200 of a computer terminal system, in accordance with an embodiment of the invention.

FIG. 2, illustrates a block diagram 200 of the computer terminal 120 system, in accordance with some embodiments of the invention. As discussed previously, the computer terminal 120 is configured to facilitate performance of user activities, and is configured to provide real-time interactive sessions for the user 102, using one or more communication channels established via the network 101. The computer terminal 120 typically includes a processing device or a processor 210, memory device 230, storage memory 220 or datastore 220, and a communication device 270. As such, the computer terminal 120, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user device 104, sensor devices 112, visual capture devices 114, the user 102, resource replenishment device 122, resource reserves station 124, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of environment parameters.

The processing device 210 may generally refer to a device or combination of devices having circuitry used for implementing the communication and/or logic functions of the computer terminal 120. For example, the processing device 210 may include a control unit, a digital signal processor device, a microprocessor device, and various analog-to-digital converters, digital-to-analog converters, and other support circuits and/or combinations of the foregoing. Control and signal processing functions of the computer terminal 120 may be allocated between these processing devices according to their respective capabilities.

The computer terminal 120 may further include various components/devices in operative communication with and/or controlled by the processor 210, such as user output devices 286, user input devices 240, a network communication interface 270 (such as a contactless interface 279), a power source 215, and the like. Furthermore, in some embodiments, the processor 210 is operatively coupled to and is configured to control other components/devices of the computer terminal 120, such as an image capture device 250, sensor devices 290, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a computer terminal application 232 (also referred to as a terminal application), an authentication module 234, a computer terminal application datastore 236 stored therein. In some embodiments, the authentication module 234 is integral with the computer terminal application 232. In some embodiments, the computer terminal applications 232 and/or the authentication module 234 may be executable to initiate, perform, complete, and/or facilitate one or more portions of any embodiment described and/or contemplated herein, either independently or in response to receiving control instructions from the processing system 130, resource replenishment device 122, and/or the resource reserves station 124. In some embodiments, the computer terminal application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the computer terminal 120 and other devices/systems in the network 101 to cause them to perform the steps. Generally, the computer terminal application 232 is executable to receive activity instructions from the user and perform user activities and the various steps described herein. In some embodiments, the computer terminal application 232 comprises a personal digital assistant for interfacing with the user at the terminal. The computer terminal application 232 may be coupled to a computer terminal application datastore 236 for storing application data as the user activity is being performed. The computer terminal application datastore 236 may store the application data temporarily for the predetermined duration of the execution of the activity (such as a memory buffer, or cache memory), or permanently.

The computer terminal 120, user device 104, resource replenishment device 122, resource reserves station 124, and/or other systems/devices may require users to identify and/or authenticate themselves before the computer terminal 120 may initiate, perform, complete, and/or facilitate a user activity. For example, in some embodiments, the computer terminal 120 is configured (and/or the computer terminal application 232 is executable) to authenticate a computer terminal user based at least partially on a computer terminal debit card, smart card, token (e.g., USB token, etc.), username, password, PIN, biometric information, and/or one or more other credentials that the user presents to the computer terminal 120. Additionally or alternatively, in some embodiments, the computer terminal 120 is configured to authenticate a user by using one-, two-, or multi-factor authentication. For example, in some embodiments, the computer terminal 120 requires two-factor authentication, such that the user must provide a valid debit card and enter the correct PIN associated with the debit card in order to authenticate the user to the computer terminal 120. However, either alternatively or in addition to the aforementioned authentication features, the computer terminal 120 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal 120, particularly the processing device 210, and other devices or systems, such as the processing system 130, the user device 104, the authentication database 118, the third party system 116, the resource replenishment device 122, the resource reserves station 124, and/or the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal 120 is configured to be coupled/connected to other devices and systems via wired communication channels. In other embodiments, the computer terminal 120 is configured to be coupled/connected to other systems/devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal 120 may include a transceiver, i.e., one or more antennas and and/or other electronic circuitry, devices, and software, for receiving data when a device is held close to or tapped at a suitable location of the computer terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the computer terminal 120 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network 101. In this regard, the computer terminal 120 may be configured to operate with one or more air interface standards, communication protocols, modulation types, and access types. By way of illustration, the computer terminal 120 may be configured to operate in accordance with any of a number of first, second, third, and/or fourth-generation communication protocols and/or the like. For example, the computer terminal 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The computer terminal 120 may also be configured to operate in accordance with non-cellular communication mechanisms, such as via a wireless local area network (WLAN) or other communication/data networks The user interface of the computer terminal 120 may include user input devices 240 and user output devices 286, as illustrated by FIG. 2. The user interface of the computer terminal 120 is typically configured to facilitate the interactive sessions with the user. The user output devices 286 typically include a display 280 (e.g., a liquid crystal display, a touchscreen display, and/or the like) which is operatively coupled to the processing device 210. In some embodiments, where the computer terminal 120 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal 120 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the computer terminal 120. The user interface may further allow for user interaction with or control of one or more of the systems/devices described herein.

As illustrated by FIG. 2, the computer terminal may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal 120 location. The images and/or video streams may be analyzed by the computer terminal 120 to determine the presence and position of the user, other individuals or objects (e.g., the resource replenishment device) and their movement in the proximity area, to identify the user for authentication or facial recognition purposes, and the like. In some embodiments, the system is configured to present a customized interface for the user based on identifying the user using facial recognition.

In some embodiments, the computer terminal 120 further comprises sensor devices 290. In some embodiments, the processor 210 communicates with, transmits instructions, and/or receives signals from the sensor devices 290, in real-time for detecting the presence of the users or other individuals, determining user location, capturing authentication credentials for the user, determining parameters associated with the user, determining trigger events, capturing one or more parameters associated with the environment or physical location of the computer terminal 120, and the like. These sensor devices 112 may be contact type sensors that determine the presence of the user or object based on contact, or non-contact type sensors that detect distant users or objects. In some embodiments, the sensor devices 290 of the computer terminal 120 are similar to the sensor devices 112 described previously, for determining the absolute or relative position, location, and proximity of the user, other individuals, or predetermined objects (such as vehicles, and vehicle features like contours of windows), within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some instances, the sensor devices 290 comprise biometric sensors for capturing parameters associated with the user, such as fingerprint scanners, voice recognition sensors, facial recognition sensors, heart rate sensors, user stress level sensors and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 3:
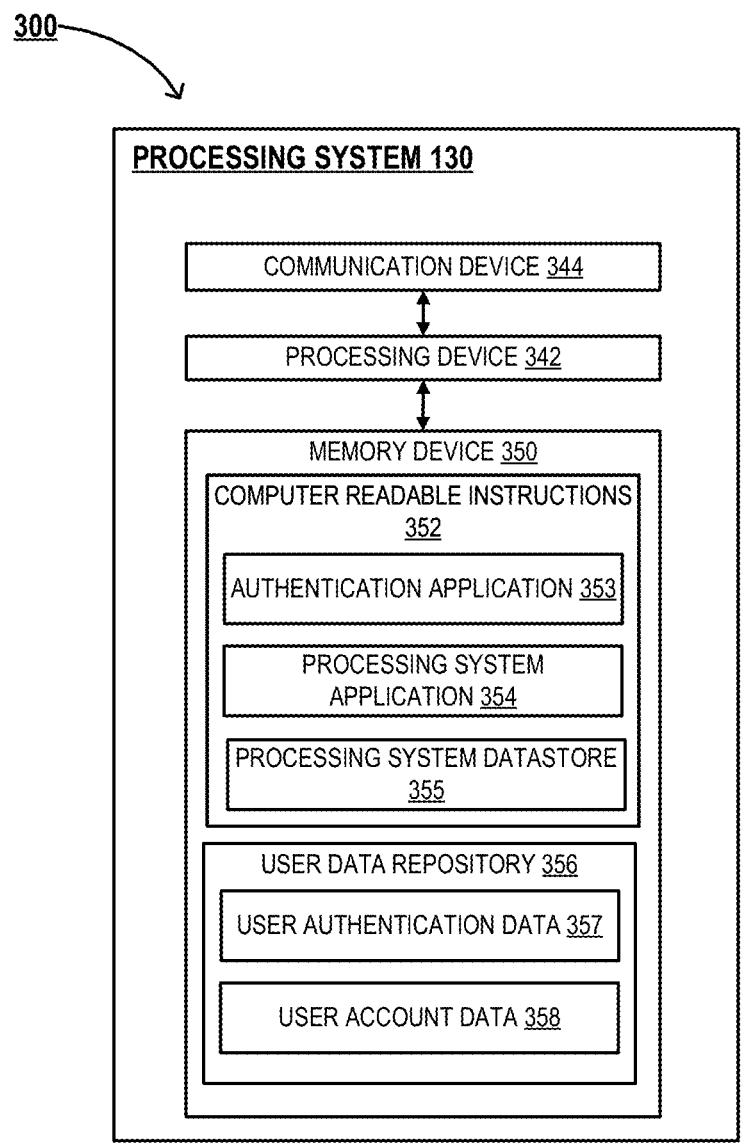
FIG. 3 illustrates a block diagram 300 of a processing system, in accordance with an embodiment of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processing device 210 of the computer terminal 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the computer terminal 120, the authentication database 118, the third party system 116, the sensor devices 112, and visual capture devices 114, the resource replenishment device 122, the resource reserves station 124, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104 or the display device 280 of the computer terminal 120. As another example, the user interface may be provided on the computer terminal 120 that may be controlled by the processing system 130 either directly or via the processing device 210 of the computer terminal 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the computer terminal 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
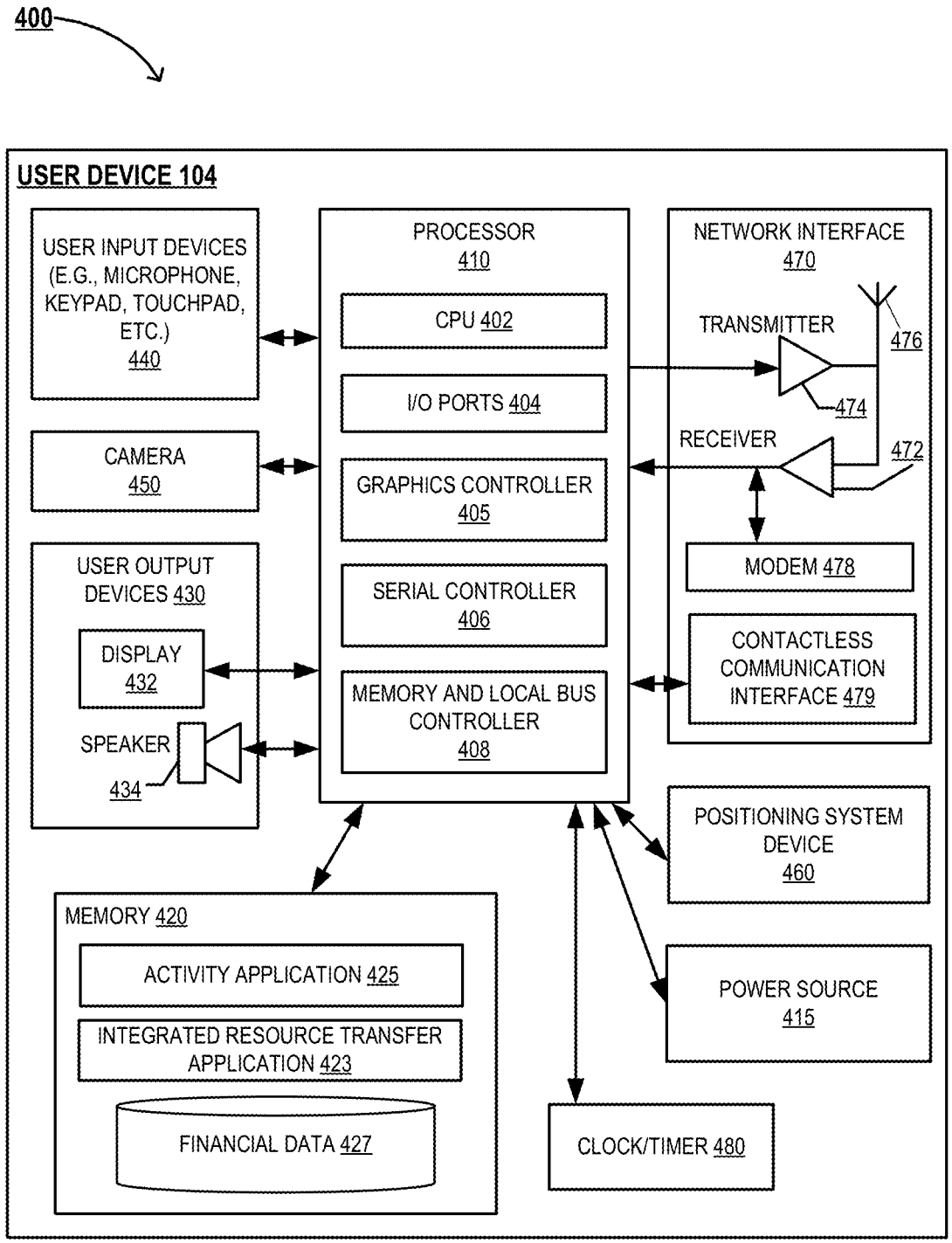
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, gaming devices, laptop computers, cameras, video recorders, audio/video player, radio, GPS devices, any combination of the aforementioned devices.

The user device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, an integrated resource transfer application 423, or a web browser application. The activity application 425 may then allow the user device 104 to transmit and receive data and instructions from the computer terminal 120 (for example, via wireless communication or NFC channels), data and instructions from the processing system 130, the resource replenishment device 122, the resource reserves station 124, web content, such as, for example, location-based content and/or other web page content, according to a Wireless Application Protocol (WAP), Hypertext Transfer Protocol (HTTP), and/or the like.

The integrated resource transfer application 423 and the financial data module 427, together may include the necessary circuitry to provide token storage and transmission functionality, transmitter device signal encoding and decoding functionality to the user device 104, for secure transmission of financial and authentication credential tokens via the contactless communication interface 479 to the computer terminal 120, the resource replenishment device 122, and/or the resource reserves station 124. That said, in some embodiments the integrated resource transfer application 423 is pre-installed on the user device 104, while in other embodiments, the computer terminal 120 may transmit and cause installation of the application 423 based on determining that the user device 104 does not comprise the application 423, when the user device is within a pre-determined distance from the terminal 120.

The processor 410 may be configured to use the network interface device 470 to communicate with one or more other devices on a network 101 such as, but not limited to the computer terminal 120, the processing system 130, the resource replenishment device 122, and the resource reserves station 124. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the user device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a user device 104 may be a battery, such as a lithium battery, a nickel-metal hydride battery, or the like, that is used for powering various circuits, for example, the transceiver circuit, and other devices that are used to operate the user device 104. Alternatively, the power source 415 may be a power adapter that can connect a power supply from a power outlet to the user device 104. In such embodiments, a power adapter may be classified as a power source "in" the user device 104.

The user device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

Figure 5:
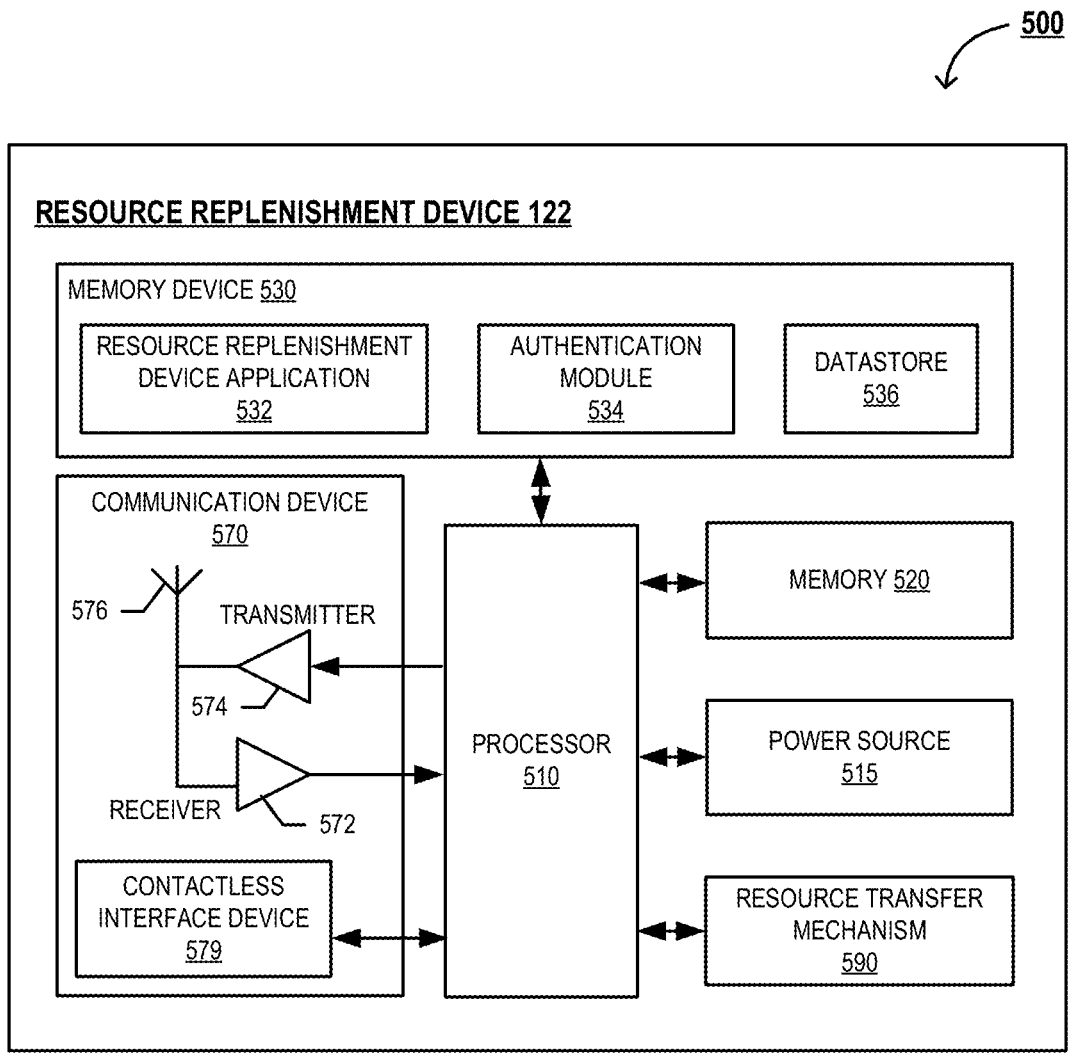
FIG. 5 illustrates a block diagram 500 of a resource replenishment device, in accordance with an embodiment of the invention.

FIG. 5 illustrates a block diagram 500 of the resource replenishment device 122, in accordance with some embodiments of the invention. The resource replenishment device 122 is configured to act as a vessel for the secure transport and transfer of one or more resources between locations (e.g., the resource reserves location 124 and the computer terminal 120), and is configured to communicate with one or more systems and devices described herein using one or more communication channels established via the network 101. The resource replenishment device 122 typically includes a processing device or a processor 510, memory device 530, storage memory 520, and a communication device 570. As such, the resource replenishment device 122, and the processor 510 is particular, is configured to perform at least a portion of the steps of the embodiments described herein, either based on executing computer readable instructions stored in the memory device 530, and/or based on receiving instructions, indications, or signals from other systems and devices such as the computer terminal 120, processing system 130, the user device 104, the user 102, resource reserves station 124, and/or other systems. In some embodiments, the processing system 130 is configured to transmit control instructions to, and cause the processing device 510 to perform one or more steps of the embodiments presented herein. For example, the processing system 130 may detect a trigger event and transmit an indication to the processing device 510. In response to receiving the control signal from the system 130, the processing device 510 may perform one or more of the steps presented herein.

The processing device 510 may generally refer to a device or combination of devices having circuitry used for implementing the communication and/or logic functions of the resource replenishment device. For example, the processing device 510 may include a control unit, a digital signal processor device, a microprocessor device, and various analog-to-digital converters, digital-to-analog converters, and other support circuits and/or combinations of the foregoing. Control and signal processing functions of the resource replenishment device 122 may be allocated between these processing devices according to their respective capabilities.

The memory device 530 and the storage memory 520 may generally refer to a device or combination of devices that store one or more forms of computer-readable media for storing data and/or computer-executable program code/instructions. In some embodiments, the storage memory 520 is integral with the memory device 530. In some embodiments, the memory device 530 comprises a non-transitory, computer readable storage medium. For example, the memory device 530 and/or the storage memory 520 may include any computer memory that provides an actual or virtual space to temporarily or permanently store data and/or commands provided to the processing device 510 when it carries out its functions described herein.

As illustrated by FIG. 5, the memory device 230 typically comprises a resource replenishment device application 532 (also referred to a replenishment application), an authentication module 534, and a datastore 536 stored therein. In some embodiments, the authentication module 534 is integral with the replenishment application 532. In some embodiments, the replenishment application 532 and/or the authentication module 534 may be executable to initiate, perform, complete, and/or facilitate one or more portions of any embodiment described and/or contemplated herein, either independently or in response to receiving control instructions from the processing system 130, computer terminal 120, and/or the resource reserves station 124. In some embodiments, the replenishment application/module 532 comprises computer readable instructions stored in the memory device 530, which when executed by the processing device 510, are configured to cause the processing device 510 to perform one or more steps of the embodiments presented herein, and/or cause the processing device to transmit control instructions to other components of the resource replenishment device 122 and other devices/systems in the network 101 to cause them to perform the steps. Generally, the replenishment application 532 is executable to receive activity instructions from the user and/or other systems and devices described herein and perform user activities and the various steps described herein. The replenishment application 532 may be coupled to a datastore 536 for storing application data as activity or steps are being performed. The datastore 536 may store the application data temporarily for the predetermined duration of the execution of the activity (such as a memory buffer, or cache memory), or permanently.

The resource replenishment device 122 typically further comprises a resource transfer mechanism 590. In some embodiments, the resource transfer mechanism may be in operative communication with the processor 510 and configured to receive instructions from the processor 510, the replenishment application 532, and/or one or more other systems, device, or users as described herein. The resource transfer mechanism may be one or more physical means or mechanisms for transporting one or more resources between an interior and exterior of the resource replenishment device 122 for secure storage, withdrawal, and transport of the one or more resources. The resource replenishment device 122 may further include various components/devices in operative communication with and/or controlled by the processor 510 that are similar in function and design of the other previously described systems such as a communication device 570 and a power source 515.

Figure 6:
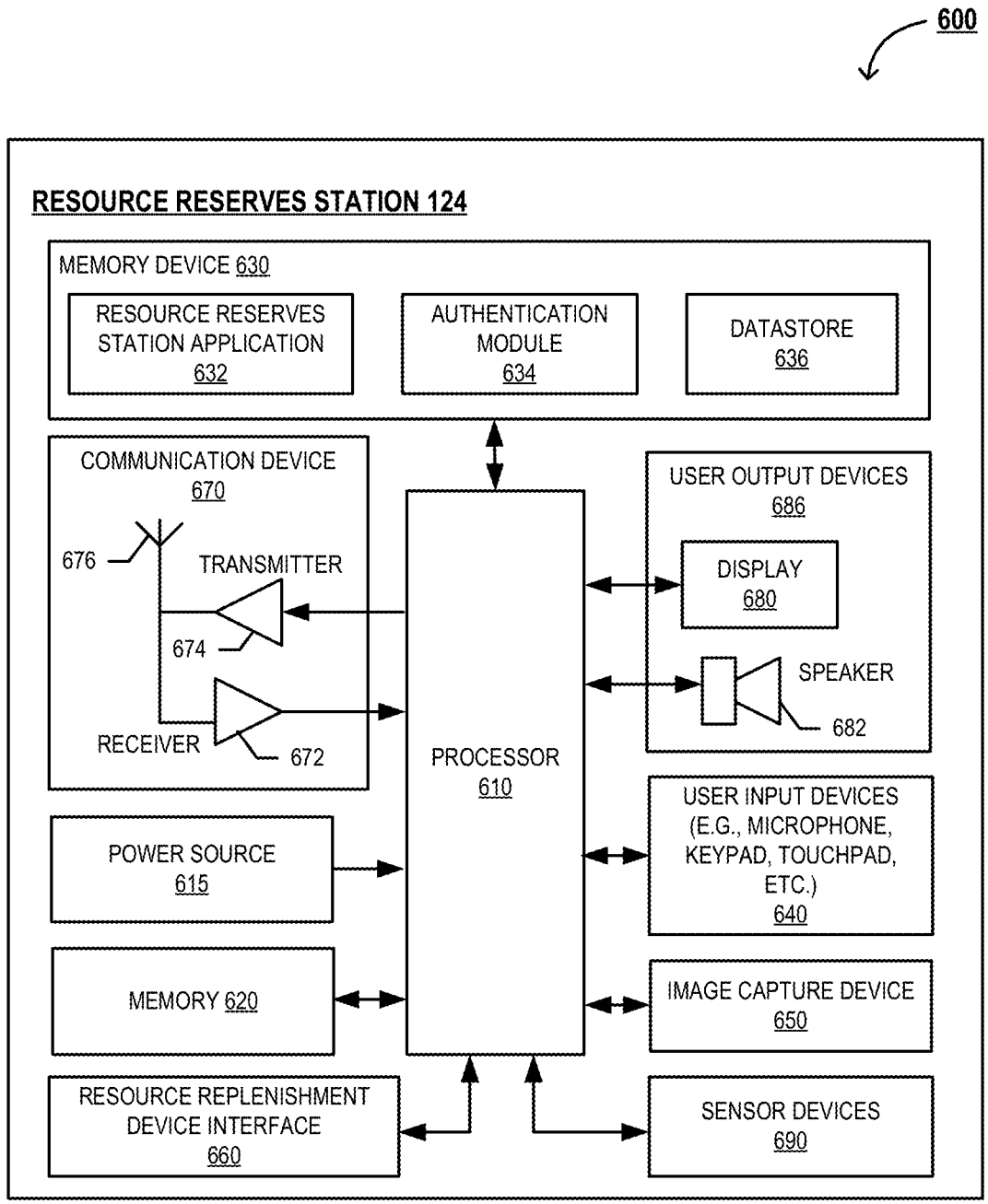
FIG. 6 illustrates a block diagram 600 of a resource reserves station, in accordance with an embodiment of the invention.

FIG. 6 illustrates a block diagram 600 of the resource reserves station 124, in accordance with some embodiments of the invention. The resource reserves station 124 is configured to securely store and provide a source of additional resources for transfer to the computing terminal 120 via the resource replenishment device 122, and is configured to communicate with one or more systems and devices described herein using one or more communication channels established via the network 101. The resource reserves station 124 typically includes a processing device or a processor 610, a power source 615, memory device 630, storage memory 620, and a communication device 670, user output devices 686, user input devices 640, an image capture device 650, and one or more sensor devices 660 that are similar in design and function to the other systems and devices previously described. The resource reserves station 124, and the processor 610 is particular, is configured to perform at least a portion of the steps of the embodiments described herein, either based on executing computer readable instructions stored in the memory device 630, and/or based on receiving instructions, indications, or signals from other systems and devices such as the computer terminal 120, processing system 130, the user device 104, the user 102, resource replenishment device 122, and/or other systems. In some embodiments, the processing system 130 is configured to transmit control instructions to, and cause the processing device 610 to perform one or more steps of the embodiments presented herein. For example, the processing system 130 may detect a trigger event and transmit an indication to the processing device 610. In response to receiving the control signal from the system 130, the processing device 610 may perform one or more of the steps presented herein.

As illustrated by FIG. 6, the memory device 630 typically comprises a resource reserves station application 532 (also referred to a reserves application), an authentication module 634, and a datastore 636 stored therein. In some embodiments, the authentication module 634 is integral with the reserves application 632. In some embodiments, the reserves application 632 and/or the authentication module 634 may be executable to initiate, perform, complete, and/or facilitate one or more portions of any embodiment described and/or contemplated herein, either independently or in response to receiving control instructions from the processing system 130, computer terminal 120, and/or the resource replenishment device 122. In some embodiments, the reserves application/module 632 comprises computer readable instructions stored in the memory device 630, which when executed by the processing device 610, are configured to cause the processing device 610 to perform one or more steps of the embodiments presented herein, and/or cause the processing device to transmit control instructions to other components of the resource reserves station 124 and other devices/systems in the network 101 to cause them to perform the steps. Generally, the reserves application 532 is executable to receive activity instructions from the user and/or other systems and devices described herein and perform user activities and the various steps described herein. The reserves application 632 may be coupled to a datastore 636 for storing application data as activity or steps are being performed. The datastore 636 may store the application data temporarily for the predetermined duration of the execution of the activity (such as a memory buffer, or cache memory), or permanently.

The resource reserves station 124 typically further comprises a resource replenishment device interface 660 for interfacing and establishing a connection between the resource replenishment device 122 and the resource reserves station 124. In some embodiments, the resource replenishment device interface 660 may be in operative communication with the processor 610 and configured to receive instructions from the processor 610, the reserves application 632, and/or one or more other systems, device, or users as described herein. The resource replenishment device interface 660 may be one or more physical and/or electrical connections (wired or wireless) for transporting one or more resources between the resource reserves station 124 and the resource replenishment device 122 for secure storage, withdrawal, and transport of the one or more resources. In some embodiments, control signals and/or instructions to perform one or more of the steps described herein may be transmitted and/or received by the resource reserves station 124 and/or the resource replenishment device 122 upon establishment of a connection between the devices. In some embodiments, the resource reserves station 124 may further comprise storage of one or more additional resources or resource reserves.

In some instances, various features and functions of the invention are described herein with respect to a "system." In some instances, the system may refer to the computer terminal 120 performing one or more steps described herein in conjunction with other devices and systems, either automatically based on executing computer readable instructions of the memory device 230, or in response to receiving control instructions from the processing system 103. In some instances, the system refers to the processing system 103. In some instances, the system refers to one or more of the devices and systems of the network environment 100 of FIG. 1 such as the resource replenishment device 122 and the resource reserves station 124. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 7A:
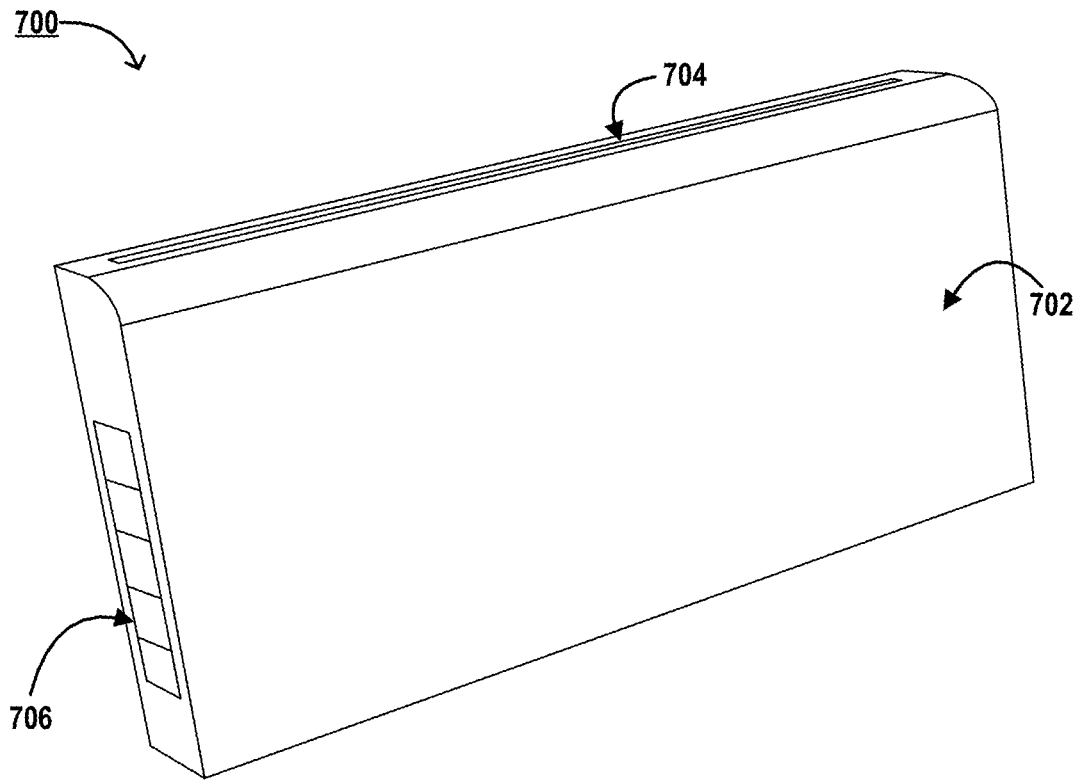
FIG. 7A illustrates a perspective view 700 of a resource replenishment device, in accordance with an embodiment of the invention.
Figure 7B:
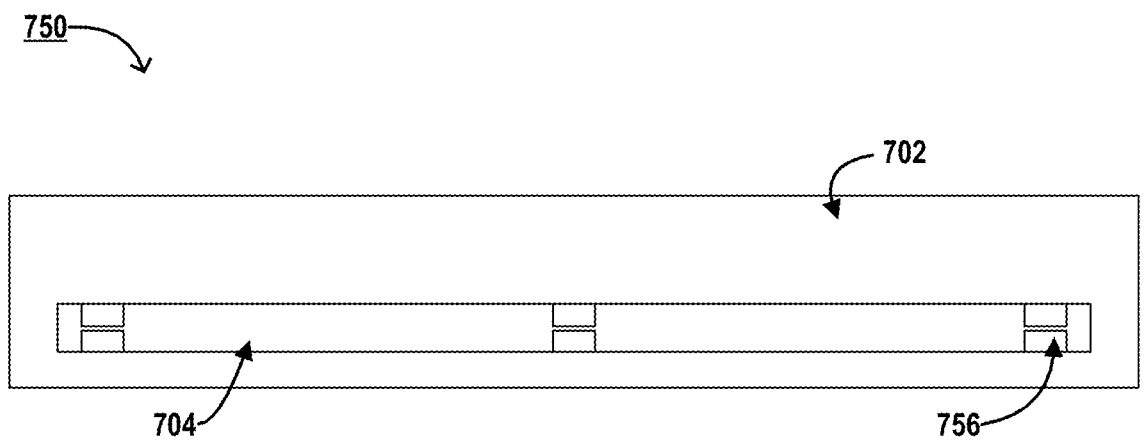
FIG. 7B illustrates a top view 750 of a resource replenishment device, in accordance with an embodiment of the invention.

FIG. 7A and FIG. 7B illustrate a perspective view 700 and a top view 750, respectively, of a resource replenishment device, in accordance with an embodiment of the invention. The resource replenishment device is generally a secure cassette or container for storage and transfer for one or more resources (e.g., cash, checks, documents, or the like). In some embodiments, a user of the resource replenishment device may be transferring resources between one or more secure locations (e.g., a bank, ATM, household, safe, armored vehicle) and employ the use of the resource replenishment device for temporary storage and transport between more permanent, secure locations.

In some embodiments, the resource replenishment device comprises a container 702 having a plurality of walls that separate an enclosed interior of the container from an exterior of the container. The interior of the container 702 is generally hollow allowing for the storage of one or more resources, mechanisms, components, and the like within the container 702. In some embodiments, the container 702 is a three-dimensional, rectangular shape. In other embodiments, the container 702 may be any three-dimensional shape having a hollow, interior cavity.

In some embodiments, the container 702 and the resource replenishment device are essentially tamper-proof, wherein unauthorized or illegal entry or access to the interior or contents of the interior of the resource replenishment device is actively and/or passively prevented. Active prevention may include generating alerts (e.g., lights, sounds, transmitted emergency signals, or the like) or anti-tampering devices (e.g., exploding ink cartridges). Passive prevention may include generally tamper-proof design and construction that prevents unauthorized or illegal access to the container 702. The container 702 of the resource replenishment device may be constructed from one or more materials including, but not limited to, high-durability plastic, metal, composite material, or the like for resisting deformation and/or structural failure due to external forces (i.e., device tampering).

In some embodiments, the container 702 may be tamper-proof or essentially tamper-proof, wherein the device construction is designed to prevent and/or discourage unauthorized access to the interior of the container 702. In this way, the container 702 may be at least partially sealed, wherein sealing joints and/or hardware (e.g., screws, hinges, or the like) are not externally exposed for access and manipulation by authorized or unauthorized users. In some embodiments, the container 702 body may be welded and sealed. In some embodiments, the container 702 may be water-proof and/or water resistant to prevent damage of the contained resources as a result of moisture.

The container 702 further has an opening 704 positioned between the interior and the exterior of the container 702, wherein the opening 704 is positioned on one or more of the plurality of walls or sidewalls of the container 702. Generally, the opening 704 allows for the transfer of resources between the interior and the exterior of the container 702.

The opening 704 may further be sealable by a door, gate, or the like, wherein one or more panels may be engaged to obstruct the opening thereby preventing access to the container interior and stored resources. In some embodiments, the sealable opening may toggle between open and sealed states based on one or more commands or signals received from the user and/or other systems and devices described herein.

In some embodiments, a resource transfer mechanism 756 may be positioned proximate to the opening 704, wherein the resource transfer mechanism 756 transports the one or more resources through the opening 704 of the container 702. In some embodiments, the resource transfer mechanism 756 may comprise one or more rollers or wheels which may apply a frictional force to resources being transported between the interior and exterior of the container 702. In some embodiments, the resource transfer mechanism 756 may further comprise a motor such as a small, battery-powered electric motor for operating the resource transfer mechanism 756. In some embodiments, the motor may be controlled by one or more of the user, systems, or devices described herein. For example, the resource transfer mechanism 756 may comprise one or more set of motorized pinch wheels that uptake resources brought into contact with the pinch wheels and transfer the resources between the interior and exterior of the container 702 as the wheels rotate. In other embodiments, the resource replenishment device may employ compressed air, suction, or the like to transport resources between the interior and exterior of the device. In other embodiments, the resource transfer mechanism 756 may not be integral to the resource replenishment device and may instead be incorporated into one or more of the systems and devices described herein, such as a docking station of a computer terminal.

In some embodiments, the resource transfer device may further comprise one or more on-device controls 706 to allow a user to input one or more commands to the resource transfer device. For example, the controls may comprise an insert button, an eject button, a lock button, a power button, or the like for control of the resource transfer device by the user.

Figure 8:
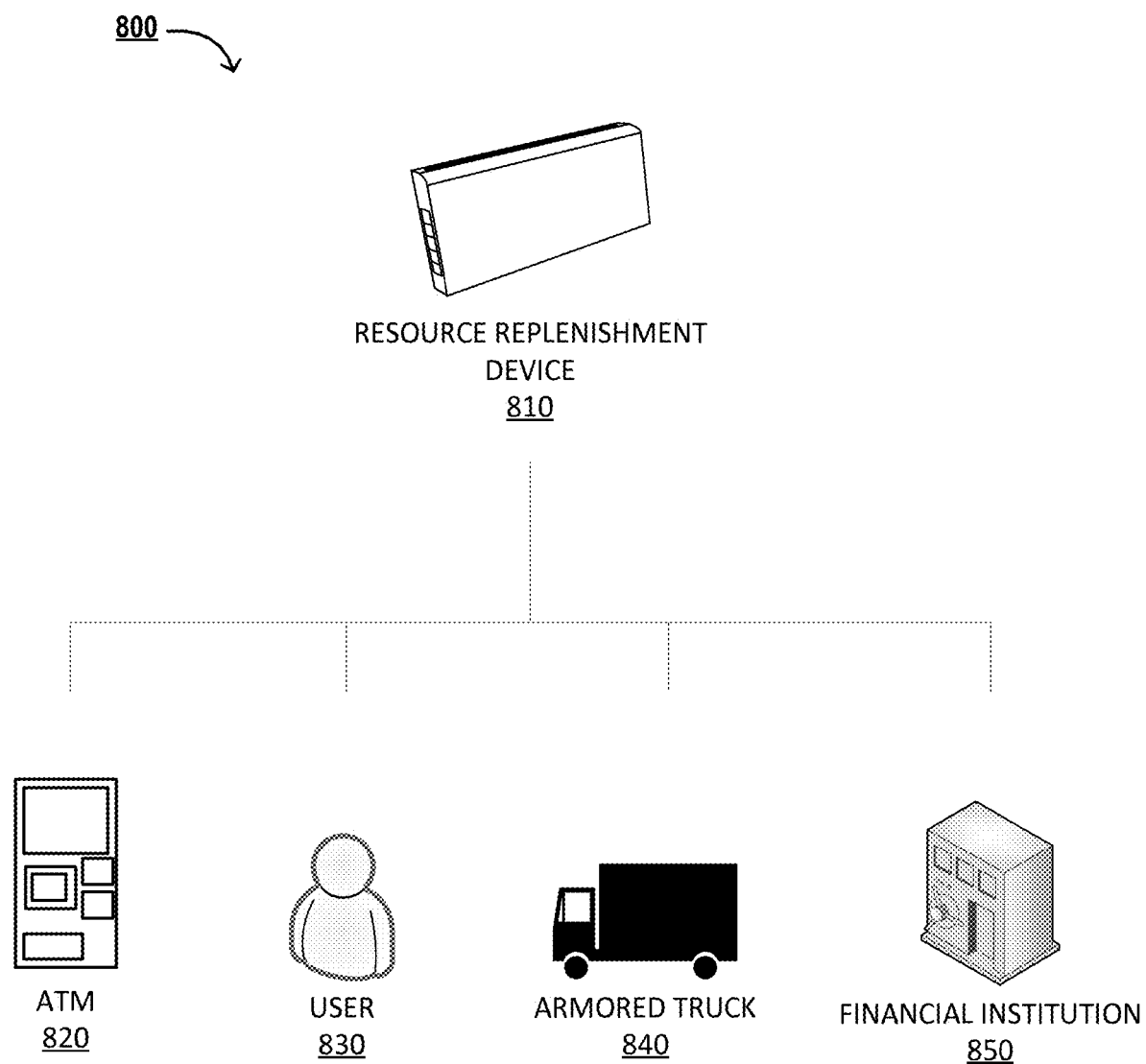
FIG. 8 illustrates an environment 800 for resource replenishment device communication, in accordance with an embodiment of the invention.

FIG. 8 illustrates an environment 800 for resource replenishment device communication, in accordance with an embodiment of the invention. As previously discussed, the resource replenishment device 810 may communicate and couple with one or more other systems or devices for secure transfer of resource between locations. As illustrated in FIG. 8, the resource replenishment device 810 may communicate with and/or couple with one or more of an ATM 820, a user 830, an armored truck 840, a financial institution 850, and/or one or more other systems or devices requiring secure resource transfer and/or replenishment. The resource replenishment device may couple with one or more of the ATM 820, armored truck 840, financial institution 850, and/or other systems or devices via a wired or wireless connection. In some embodiments, the resource replenishment device 810 may couple with another device or system via a docking station integral to the other device allowing for secure transfer of resources between the resource replenishment device 810 and the other device. The docking station may be positioned on an exterior surface of a computer terminal and comprise a port allowing for establishment of a connection and wired and/or wireless communication between devices for transmitting one or more control signals and information (e.g., the contents of the resource replenishment device and/or instructions for transfer between devices). In some embodiments, the top side of the resource replenishment device 810 may be coupled with the port of the docking station to allow for resources transfer between the opening of the resource replenishment device 810 and the docking station. In one example, the resource replenishment device 810 may be coupled to an ATM 820 to transfer cash (i.e., resources) to the ATM 820 to replenish the amount of cash stored in the ATM 820. In another example, the resource replenishment device 810 may be coupled to a docking station of an armored truck 840 or financial institution 850, wherein the truck 840 or financial institution 850 are resource sources and cash (i.e., resources) is transferred to the replenishment device 810 for resource distribution (e.g., to the ATM of the previous example). In some embodiments, the resource replenishment device may be removable, operatively coupled to the computing device to allow for the resource replenishment device to be supported and remain stable in place during connection with the computing device.

In some embodiments, the resource replenishment device 810 may be associated with a user 830 for resource transfer. In some embodiments, the user 830 may store resources within the device 810 for secure transport and transfer at another device or location. For example, the user 830 may insert cash or another resource into the device 810 and bring the device 810 to one or more of the devices or locations described herein (i.e., ATM, armored truck, financial institution, or the like) for device 810 coupling and resource transfer as previously discussed. In this way, resource may be securely and anonymously transferred by a user 830. The resource transfer performed by the device 810 is generally faster than a manual resource transfer as the transfer and counting of the resources is automated by the devices involved.

Figure 9:
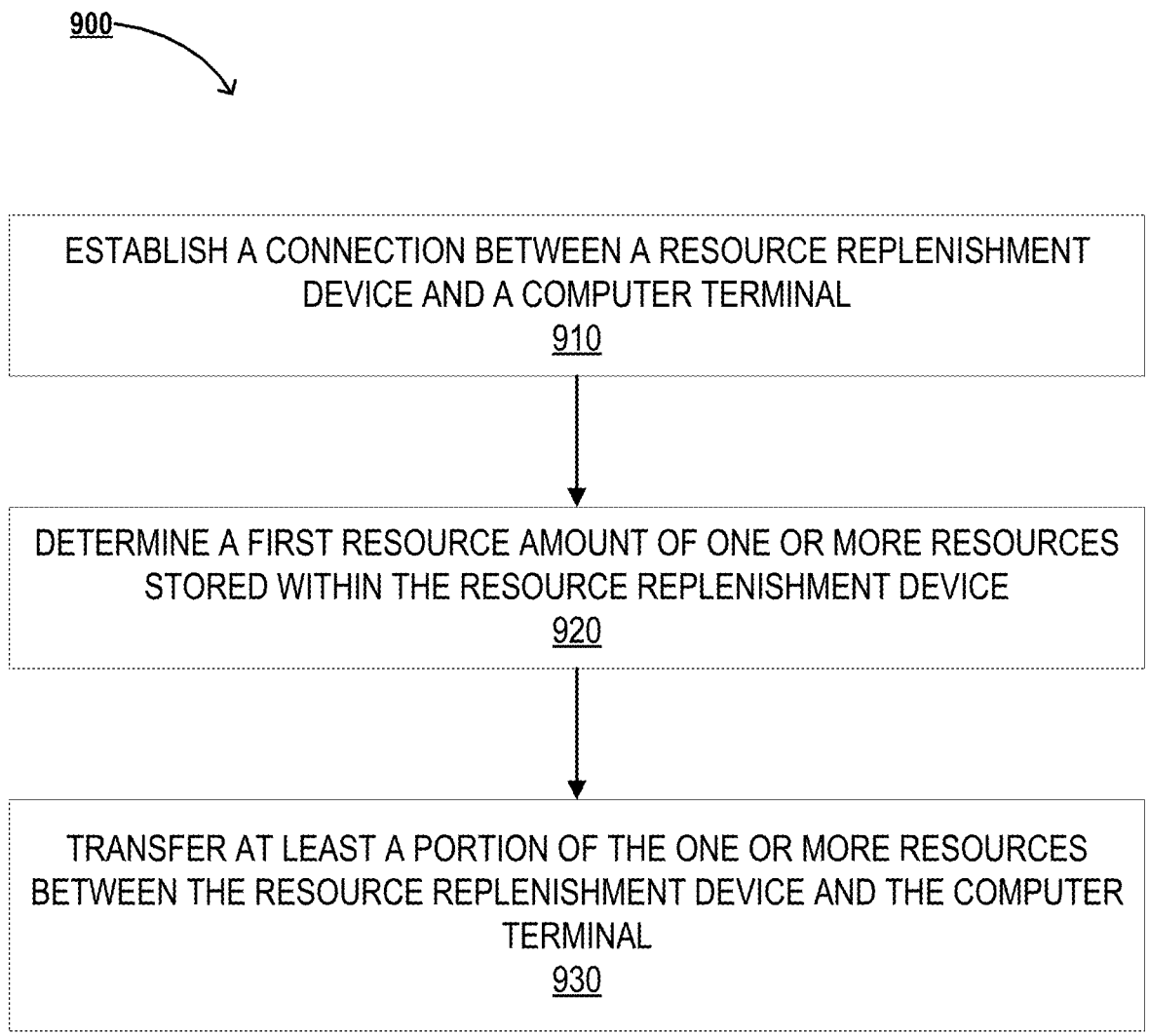
FIG. 9 illustrates a process flow 900 for secure resource distribution, in accordance with an embodiment of the invention.

FIG. 9 illustrates a process flow 900 for secure resource distribution, in accordance with an embodiment of the invention. As illustrated in block 910, the system first establishes a connection between a resource replenishment device and a computer terminal. The connection may be established via one or more of a wired (i.e., via a docking station) or wireless (e.g., NFC, Bluetooth, Internet, or the like) connection between the devices. In some embodiments, one or more of the devices may passively search for other devices and attempt to automatically establish a connection. In some embodiments, the system may automatically trigger establishment of a connection in response to a coupling of the resource replenishment device and a docking station of another device (e.g., ATM). In some embodiments, one or more of the user, devices, and/or system provided herein may be prompted to provide authentication information or credentials before the connection is completely established and resource transfer is available (e.g., provide account login credentials, two-step verification, mobile device verification, in-app verification, biometric information, or the like). For example, a user may be prompted to provide authentication information via a user device (e.g., a smart phone) associated with the user which may then communicate either directly (e.g., NFC, Bluetooth, WiFi, IR, image scanning, or the like) or indirectly (e.g., through an application over the internet) with the computer terminal (e.g., ATM).

As illustrated in block 920, the system next determines a first resource amount of the one or more resources stored in the resource replenishment device and/or computer device. The system must determine the amount of resource stored within at least one of the devices involved in the resource transfer to determine an amount of resources to transfer. In some embodiments, a resource amount value is transmitted and stored within a memory of a device upon initial transfer and storage of resources to said device. In some embodiments, devices, such as the resource replenishment device, computer terminal, or the like, may calculate an amount of resources stored internally via one or more sensors, scanners, or the like for identifying resources (e.g., optical scanners, infrared scanners, magnetic ink sensors, or the like). In some embodiments, the system may transmit a request to the one or more devices to query an amount of resources stored thereon. In other embodiments, the system maintain, update, and monitor an internal database tracking all resource amount of devices within the system.

Finally, as illustrated in block 930, the system transfers at least a portion of the one or more resources between the resource replenishment device and the computer terminal. In some embodiments, establishing the connection between the resource replenishment device and the computer terminal may trigger an automatic transfer of resources between devices. In some embodiments, the transferred resource amount may be based on the previously determined or calculated resource amounts of the resource replenishment device and/or the other device involved in the transfer. For example, an amount of resources may be transferred to overcome a determined resource deficiency of a device (e.g., an ATM is low on a denomination of bills).

In some embodiments, the resource replenishment device may only open and/or transfer resources based on the user or one or more devices described herein provided authentication information (e.g., password, token, device identifier (e.g., serial number of the like), PIN number, or the like). In some embodiments, the resource replenishment device may only open and/or transfer resources based on the resource replenishment device being determined to be positioned at a particular location as determined by a GPS device of the resource replenishment device and/or one or more other devices in communication with the resource replenishment device. For example, the resource replenishment device may only open and/or transfer resource upon the device being located at a pre-determined location set by the user and/or system.

Figure 10:
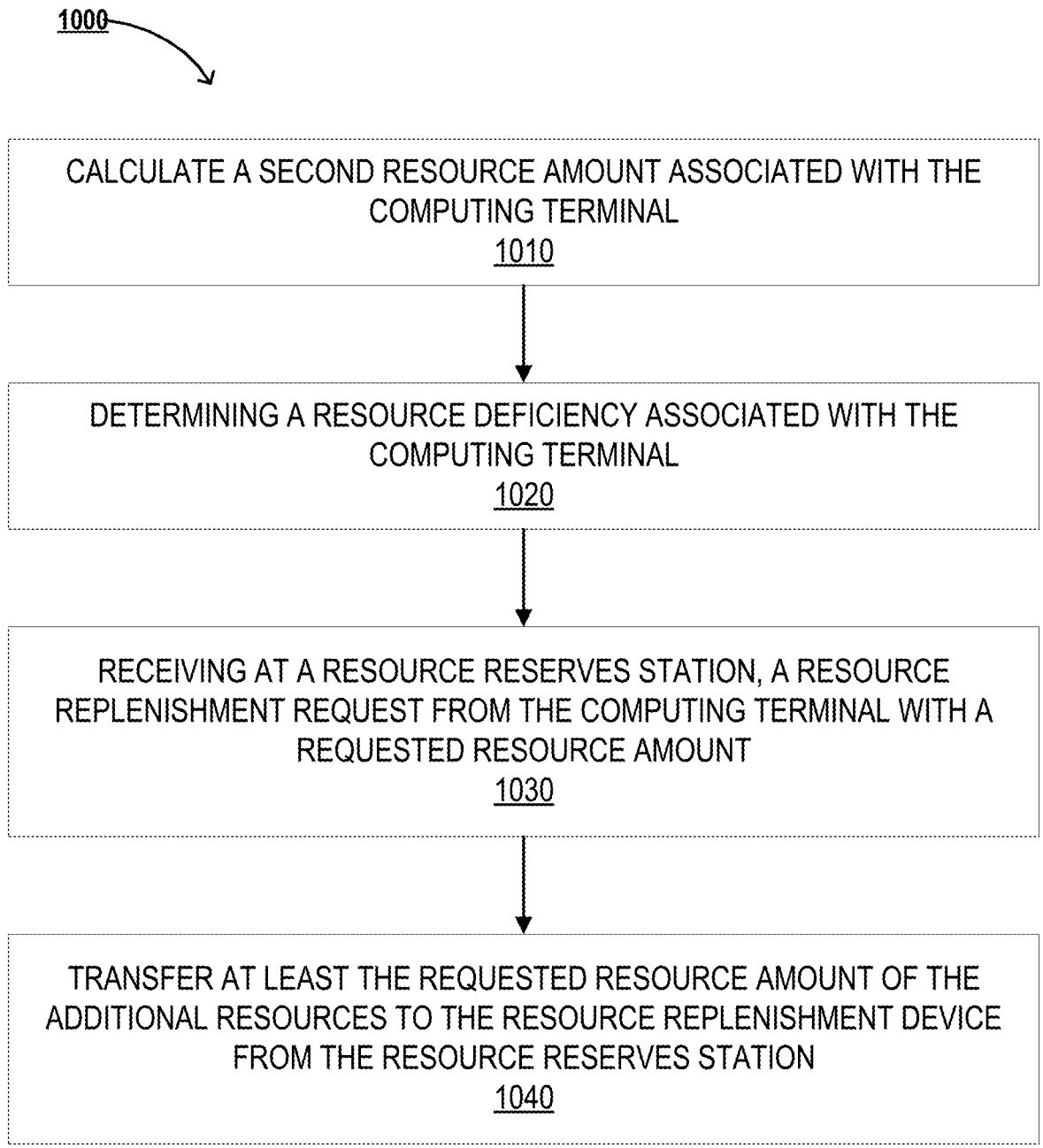
FIG. 10 illustrates a process flow 1000 for secure resource distribution with a resource reserves station, in accordance with an embodiment of the invention.

FIG. 10 illustrates a process flow 1000 for secure resource distribution with a resource reserves station, in accordance with an embodiment of the invention. As illustrated in block 1010, the system calculates a second resource amount associated with the computer terminal. The computer terminal may be any device or location that may request or accept a transfer of resources (e.g., resource replenishment or deposit).

As illustrated in block 1020, the system determines a resource deficiency associated with the computer terminal. The determining of a resource deficiency may be in response to the calculating of the second resource amount of the computer terminal. For example, upon calculating a second resource amount associated with an ATM, the system may determine that the ATM is deficient a total cash amount, one or more denominations of cash, or the like. In another embodiment, the system may determine the computing terminal has an excess of resources, wherein the computing terminal is near resource storage capacity and may require a resource transfer to alleviate the excess resource storage. In some embodiments, a resource deficiency may be determined based on a resource amount, such as the second resource amount, being outside of a predetermined limit. For example, the system may determine a resource deficiency associated with an ATM upon determining that the ATM has below $10,000 in $20 bills remaining.

As illustrated in block 1030, the system receives a resource replenishment request from the computer terminal, the request comprising a requested resource amount. The request resource amount may be an amount to at least overcome a determined resource deficiency. In other embodiments, the requested resource amount may be a request for transfer of an amount of excess resource from the computer terminal for storage in another device. In some embodiments, the computer terminal transmits the resource replenishment request via the network to one or more other devices. In some embodiments, the resource replenishment request may be transmitted to a resource reserves station or source, wherein the reserves station comprises a large, stored reserve of resources available for distribution to one or more other devices of the system to alleviate resource deficiencies. The resource reserves station may further have capacity and excess storage space available to accept deposits from other devices. In some embodiments, the resource reserves station may be located or positioned remotely from the computer terminal. In some embodiments, the resource reserves station and the computer terminal may only be connected via the network, wherein a resource replenishment request may be transmitted via an established connection from the computer terminal to the resource reserves station.

As illustrated in block 1040, the system transfers at least the requested resource amount of the additional resources to the resource replenishment device from the resource reserves station using the additional resources stored within the resource reserves station. The transfer of resources between devices may be based on at least one of the calculated second resource amount, the determined resource deficiency, and the resource replenishment request. In some embodiments, the resource replenishment device may be detachably coupled with the resource reserves station (e.g., an armored truck, bank vault, ATM, or the like) via a docking station to allow for the requested resource amount to be transferred to the resource replenishment device. The resource replenishment device may then be detached from the resource reserves station, transported (i.e., by a user, employee, or the like) to the requesting, deficient computing terminal, and connected and coupled to the computing terminal to transfer the requested resource amount to the computer terminal. Alternatively, the process may involve a deposit from a computing device to a resource reserves station, wherein the resource replenishment device is first coupled to the computer terminal to receive an excess resource amount for transfer to a resource reserves station for deposit.

In some embodiments, resources may be redistributed among nearby computer terminals (e.g., ATMs) and resources reserves stations on-demand to satisfy immediate resource deficiency requests or resources excesses. For example, resources may be transferred to a first ATM from a nearby second ATM via the resource replenishment device and replenishment method described herein upon determination of a resource deficiency associated with the first ATM, wherein the closest resource reserves station is locate farther from the first ATM than the second ATM.

In some embodiments, the amount of resources available within a resource replenishment device or the capacity of the resource replenishment device may be less than a total requested resource amount associated with a deficient computer terminal. While the computer terminal may still receive the lower resource amount of the resource replenishment device, the system, in response to determining that the total requested resource amount has not been satisfied may calculate a second requested resource amount to satisfy the total requested resource amount originally requested by calculating a difference of resource between the total requested resource amount and the lower resource amount received from the resource replenishment device. In response to determining that the deficiency has not been overcome and/or calculating the second requested resource amount, the system may request a second resource replenishment for the calculated resource difference, wherein the resource difference may be received from a resource replenishment device in an additional resource distribution process.

In some embodiments, a resource replenishment device may remain coupled to a computing terminal, such as an ATM, to provide an active supply of resources to the computing terminal during normal operation. Upon, reaching a lower supply threshold, the system may trigger a resource replenishment process as previously described to replace a deficient resource replenishment device with a new resource replenishment device with requested resources.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/633,308 | MOBILE CELLULAR DEVICE TRANSLATION INTO A SECURE CHANNEL IDENTIFIER FOR RESOURCE MANAGEMENT | Concurrently herewith |
| 15/632,731 | RESOURCE DISTRIBUTION CHANNEL AUTHORIZATION THROUGH THIRD PARTY SYSTEM INTEGRATION | Concurrently herewith |
| 15/632,728 | MACHINE PRESENTED TARGETED ODD DENOMINATIONAL RESOURCE DISTRIBUTOR SYSTEM | Concurrently herewith |

What is claimed is:

1. A system for secure resource distribution, the system comprising:
   a resource replenishment device comprising a geolocation device;
   a computer terminal;
   a memory device comprising computer-readable program code;
   a communication interface; and
   a processor operatively coupled to the memory device, and the communication interface, wherein the processor is configured to execute the computer-readable program code to:
   establish a connection between the resource replenishment device and the computer terminal;
   determine, via the geolocation device, that the resource replenishment device is located at a predetermined location;
   receive authentication information from a user device associated with a user, wherein the authentication information is used to authenticate an identity of the user;
   determine a first resource amount of one or more resources stored within the resource replenishment device; and
   transfer at least a portion of the one or more resources between the resource replenishment device and the computer terminal based on (1) the resource replenishment device being located at the predetermined location, and (2) authenticating the identity of the user.

2. The system of claim 1, wherein the resource replenishment device further comprises:
   a tamper-proof container with a sealable opening positioned between an interior and an exterior of the tamper-proof container; and
   a resource transfer mechanism positioned proximate to the sealable opening,
   wherein the tamper-proof container securely stores the one or more resources within the interior of the tamper-proof container, and
   wherein the resource transfer mechanism transports the one or more resources through the sealable opening positioned between the interior and the exterior of the tamper-proof container.

3. The system of claim 2, wherein the resource transfer mechanism comprises at least one motorized roller positioned proximate to the sealable opening of the tamper-proof container, wherein the motorized roller frictionally and rotatably contacts at least a portion of the one or more resources to transport the one or more resources between the interior and the exterior of the tamper-proof container.

4. The system of claim 1, wherein the computer terminal further comprises a docking station positioned on an exterior surface of the computer terminal to receive the resource replenishment device, wherein the docking station establishes the connection between the resource replenishment device and the computer terminal.

5. The system of claim 4, wherein the connection established between the resource replenishment device and the docking station at least partially triggers transfer of the one or more resources are transferred between the resource transfer mechanism and the docking station.

6. The system of claim 1, wherein the connection established between the resource replenishment device and the computer terminal is one or more of a wired connection and a wireless connection.

7. The system of claim 1, wherein transferring at least a portion of the one or more resources between the resource replenishment device and the computer terminal further comprises validating authentication credentials received from the resource replenishment device and the computer terminal.

8. The system of claim 1, wherein the processor is further configured to execute the computer-readable program code to:
   calculate a second resource amount associated with the computer terminal;
   determine a resource deficiency associated with the computer terminal; and
   receive a resource replenishment request from the computer terminal, the resource replenishment request comprising a requested resource amount that is at least equal to the resource deficiency.

9. The system of claim 8, wherein the system further comprises:
   a resource reserves station positioned remotely from the computer terminal comprising additional resources,
   wherein the resource replenishment device is detachably coupled with the resource reserves station, and
   wherein the processor is further configured to execute the computer-readable program code to:
   receive the resource replenishment request transmitted via the established connection from the computer terminal to the resource reserves station; and
   in response to receiving the resource replenishment request, transfer at least the requested resource amount of the additional resources to the resource replenishment device from the resource reserves station.

10. The system of claim 9, wherein the resource replenishment device is detached from the resource reserves station, transported to the computer terminal, and connected to the computer terminal to transfer the requested resource amount of the additional resources to the computer terminal.

11. The system of claim 8, wherein the processor is further configured to execute the computer-readable program code to determine the resource deficiency based on the second resource amount associated with the computer terminal being outside of a predetermined limit.

12. The system of claim 1, wherein the computer terminal is an ATM.

13. The system of claim 1, wherein the one or more resources comprise at least one of cash, coins, checks, receipts, and printed documents.

14. A computer program product for secure resource distribution, the computer program product comprising at least one non-transitory computer-readable medium having computer-readable program code portions embodied therein, the computer-readable program code portions comprising:
- an executable portion configured for establishing a connection between a resource replenishment device and a computer terminal;
- an executable portion configured for determining, via a geolocation device, that the resource replenishment device is located at a predetermined location;
- an executable portion configured for receiving authentication information from a user device associated with a user, wherein the authentication information is used to authenticate an identity of the user;
- an executable portion configured for determining a first resource amount of one or more resources stored within the resource replenishment device; and
- an executable portion configured for transferring at least a portion of the one or more resources between the resource replenishment device and the computer terminal based on (1) the resource replenishment device being located at the predetermined location, and (2) authenticating the identity of the user.

15. The computer program product of claim 14, wherein the computer-readable program code portions further comprise:
- an executable portion configured for calculating a second resource amount associated with the computer terminal;
- an executable portion configured for determining a resource deficiency associated with the computer terminal; and
- an executable portion configured for receiving a resource replenishment request from the computer terminal, the resource replenishment request comprising a requested resource amount that is at least equal to the resource deficiency.

16. The computer program product of claim 15, wherein the computer-readable program code portions further comprise:
- an executable portion configured for receiving the resource replenishment request transmitted via the established connection from the computer terminal to a resource reserves station positioned remotely from the computer terminal and comprising additional resources; and
- an executable portion configured for, in response to receiving the resource replenishment request, transferring at least the requested resource amount of the additional resources to the resource replenishment device from the resource reserves station.

17. The computer program product of claim 14, wherein the computer-readable program code portion further comprise an executable portion configured for establishing the connection between the resource replenishment device and the computer terminal via a docking station positioned on an exterior surface of the computer terminal for receiving the resource replenishment device.

18. A computer-implemented method for secure resource distribution, the method comprising:
- establishing a connection between a resource replenishment device and a computer terminal;
- determining, via a geolocation device, that the resource replenishment device is located at a predetermined location;
- receiving authentication information from a user device associated with a user, wherein the authentication information is used to authenticate an identity of the user;
- determining a first resource amount of one or more resources stored within the resource replenishment device; and
- transferring at least a portion of the one or more resources between the resource replenishment device and the computer terminal based on (1) the resource replenishment device being located at the predetermined location, and (2) authenticating the identity of the user.

19. The computer-implemented method of claim 18, the method further comprising:
- calculating a second resource amount associated with the computer terminal;
- determining a resource deficiency associated with the computer terminal; and
- receiving a resource replenishment request from the computer terminal, the resource replenishment request comprising a requested resource amount that is at least equal to the resource deficiency.

20. The computer-implemented method of claim 19, the method further comprising:
- receiving the resource replenishment request transmitted via the established connection from the computer terminal to a resource reserves station positioned remotely from the computer terminal and comprising additional resources; and
- in response to receiving the resource replenishment request, transferring at least the requested resource amount of the additional resources to the resource replenishment device from the resource reserves station.

* * * * *